United States Patent
Buser et al.

(10) Patent No.: US 7,257,771 B2
(45) Date of Patent: Aug. 14, 2007

(54) SYSTEM AND METHOD FOR CONVERTING A PAGE DESCRIPTION FILE TO A COMPOSITE REPRESENTATION THEREOF FOR FAST WEB VIEWING

(75) Inventors: Cimarron Buser, Wellesley, MA (US); Felix Pahl, Berlin (DE)

(73) Assignee: Texterity, Inc., Southborough, MA (US)

(*) Notice: Subject to any disclaimer, the term of this patent is extended or adjusted under 35 U.S.C. 154(b) by 316 days.

(21) Appl. No.: 10/854,114

(22) Filed: May 26, 2004

(65) Prior Publication Data
US 2005/0268228 A1   Dec. 1, 2005

(51) Int. Cl.
*G06N 3/00* (2006.01)
(52) U.S. Cl. .................. 715/523; 715/517
(58) Field of Classification Search .......... 715/526, 715/513, 502, 501.1, 523, 517
See application file for complete search history.

(56) References Cited

OTHER PUBLICATIONS

Clickcat, PDF to HTML Converter, Oct. 2002, Heinz-Geerd Neumann, pp. 1-194.*

* cited by examiner

*Primary Examiner*—Stephen Hong
*Assistant Examiner*—Manglesh Patel
(74) *Attorney, Agent, or Firm*—Iandiorio & Teska

(57) ABSTRACT

A system for converting a page description file to a composite representation thereof for fast web viewing, the system includes a conversion engine configured to convert a page of graphics into an aggregate file, a rendering utility for rendering the aggregate file, a comparison engine for comparing the image-only bitmap and the aggregate bitmap to create a foreground bitmap file which is displayed on a Web browser and a delivery engine for delivering the foreground bitmap file and the background raster file to a Web browser by creating HTML code which superimposes the foreground bitmap file and the background raster file, thereby providing a small sized, high quality image and text composite representation of the page description file.

20 Claims, 4 Drawing Sheets

SYSTEM AND METHOD FOR CONVERTING A PAGE DESCRIPTION FILE TO A COMPOSITE REPRESENTATION THEREOF FOR FAST WEB VIEWING

FIELD OF INVENTION

This invention relates to a document conversion system and method useful for converting an electronic page description file with images, text, font metrics, and line drawing instructions therein to an optimized, high quality composite representation which can be viewed with any standard Web browser.

BACKGROUND OF INVENTION

Electronic, page-based documents displayed on the Internet may contain both text and images, e.g., catalogs, brochures, magazines, books, financial reports, and the like. Prior systems and methods for displaying these documents require providing these documents in their native file format, e.g., MICROSOFT WORD®, QUARK®, PAGEMAKER®, and the like require the user to install and run specific application programs in order to view these documents. Alternatively, these documents may be converted to one or more page description files, such as postscript, or the ADOBE® PDF file format, which requires a PDF viewing program or plug-in, such as the ADOBE® Reader to be installed on the user's computer before the PDF file can be viewed. After the plug-in is installed, the desired PDF document is downloaded and viewed via any standard Web browser, such as the INTERNET EXPLORER® or NETSCAPE® programs.

One prior technique to overcome the need for users to install a PDF application program or plug-in is to convert the PDF file with images therein to an image file in a format such as JPEG (Joint Photographic Experts Group), PNG (Portable Network Graphics) or GIF (Graphic Interchange Format) which are typically supported by all standard Web browsers. PNG files can be optimized to provide a compact, high-quality representation of vector line drawings (e.g., text) in the page description file. However, incorporation of images from the page description file significantly increases the size of the PNG file, which leads to increased download time and storage requirements. GIF files are limiting because they can only support images with a maximum of 256 colors. The JPEG format allows a relatively compact file with high image quality representation of the images in the page description file to be produced by using a lossy compression method, but this results in poor quality vector line drawings and text. The JPEG format allows both high-quality line drawings (text) and images when lossy compression is not utilized, but files produced in this way are very large.

SUMMARY OF THE INVENTION

It is therefore an object of this invention to provide a system and method for converting a page description file to a composite representation thereof.

It is a further object of this invention to provide such a system and method which provides fast web viewing and browsing.

It is a further object of this invention to provide such a system and method which provides a compact, high-quality text and image representation of a page description file.

It is a further object of this invention to provide such a system and method in which the representation of a page description file can be viewed without the need for a viewing program or plug-in.

It is a further object of this invention to provide such a system and method in which the representation of a page description file can be viewed by any standard Web browser.

The invention results from the realization that a truly effective system and method for converting a page description file to a composite representation of the page description file is achieved by the unique combination of: 1) a conversion engine for converting a page of the page description file into a) an aggregate file which contains all elements of the page description file page (i.e., a representation of the entire page of the page description file including the text, font metrics, line drawing instructions, and images) and b) an image-only file which contains all metrics that represent the background image object files of the page description file page (i.e., a representation of only the image part of the page description file page); 2) a rendering utility for rendering the aggregate file to a high-quality aggregate bitmap and for rendering the image-only file to a high-quality image-only bitmap; 3) a comparison engine which subtracts the image-only bitmap from the aggregate bitmap to create a foreground bitmap and which also renders the image-only bitmap to a high-quality raster bitmap file, and 4) a delivery engine which delivers both the foreground bitmap file (e.g., text and line drawings) and the background raster file (a high-quality rendered image-only file) or the foreground bitmap file and the background image object files (images present in the original unconverted page description file) to a Web browser based on a comparison of the size of the background raster file and the background object files (whichever is smaller), thus providing a high-quality, compact composite representation of the page of the page description file which has both high-quality text and images and can be viewed on any standard Web browser without the need for a plug-in or application viewing program.

This invention features a system for converting a page description file to a composite representation thereof for fast web viewing, the system including a conversion engine configured to convert a page of the graphics based page description file into an aggregate file having all display metrics of the page and to convert the page into an image-only file having metrics that represent the background image object files of the page, a rendering utility for rendering the aggregate file to an aggregate bitmap and for rendering the image-only file into an image-only bitmap, a comparison engine for comparing the image-only bitmap and the aggregate bitmap to create a foreground bitmap file which can be displayed on a Web browser, the comparison engine further including a conversion sub-routine for converting the image-only bitmap file to a background raster file, and a delivery engine for delivering the foreground bitmap file and the background raster file, or the foreground bitmap file and the background image object files, to a Web browser by creating HTML code which superimposes the foreground bitmap file and the background raster file or the foreground bitmap file and the background image object files on a Web browser, thereby providing a small sized, high quality image and text composite representation of the page of the page description file.

In a preferred embodiment the delivery of the foreground bitmap file and the background raster file, or the foreground bitmap file and the background image object files may be based on the Web browser type and the smaller file size of the background raster file or the background image object files. The foreground bitmap may be transparent except where the pixels in the aggregate bitmap differ from the pixels of the image-only bitmap. The image-only file may include a plurality of image object files. The plurality of image object files may be configured in an image format such as JPEG, PNG, or GIF. The aggregate file may be configured in a language such as SVG. The rendering utility may be a utility such as BATIK® rendering utility or ADOBE® Graphics Server rendering utility. The background raster file may be configured in an image format such as JPEG or PNG. The system may be configured to be compatible with HTML and HTML coding standards such that no additional application, or program, or plug-in other than the Web browser is required to display the composite representation of the page of the page description file. The HTML image standards may include JPEG and PNG. The system may include a user input routine configured to enter a desired zoom factor. The image zoom factor may be any number greater than zero including the visible range on a Web browser window from about 10.00% to 1200.00%. The delivery engine may be located on a server computer.

This invention also features a method for converting a page description file to a composite representation thereof for fast web viewing, the method including the steps of converting a page of the page description file into an aggregate file having all display metrics of the page description file page, converting a page of the page description file into an image-only file having metrics that represent the background image object files of the page description file page, rendering the aggregate file to an aggregate bitmap, rendering the image-only file into an image-only bitmap, comparing the image-only bitmap and the aggregate bitmap to create a foreground bitmap which can be displayed on a Web browser, converting the image-only bitmap file to a background raster file, and delivering the foreground bitmap file and the background raster file, or the foreground bitmap file and the background image object files, to a Web browser; by creating HTML code which superimposes the foreground bitmap file and the background raster file, or the foreground bitmap file and the background object files on the Web browser, to provide a small sized, high quality image and text composite representation of the page of the page description file.

In a preferred embodiment, the delivery of the foreground bitmap file and the background raster file or the foreground bitmap file and the background object file may be based on a Web browser type and the smaller file size of the background raster file and the background object files.

This invention further features a method for converting an electronic document with at least one image and text to a composite representation, the method including the steps of converting an electronic document with at least one image and text to a representation of the image without the text and a representation of the image with the text, comparing the representation of the image with the text to the representation of the image without the text to isolate the text, and delivering the isolated text and the image in a superimposed fashion.

In one embodiment, the delivery may include delivering the image of the electronic document or the representation of the image, whichever is smaller. The electronic document may be a graphics based page description file. The representation of the image may be converted from an image bitmap file to a background raster file. The representation of the image with text may be stored in an aggregate bitmap file.

This invention also features a system for converting an electronic document with at least one image and text to a composite representation, the system comprising a conversion engine configured to convert an electronic document with at least one image and text to a representation of the image without the text and a representation of the image with the text, a comparison engine configured to compare the representation of the image with the text to the representation of the image without the text to isolate the text, and a delivery engine configure to deliver the isolated text and the image in a superimposed fashion.

In one embodiment, the delivery engine may deliver the image of the electronic document or the representation of the image, whichever is smaller. The electronic document may be a graphics based page description file. The conversion engine may be configured to convert the representation of the image from an image bitmap file to a background raster file. The representation of the image with text may be stored in an aggregate bitmap file.

BRIEF DESCRIPTION OF THE DRAWINGS

Other objects, features and advantages will occur to those skilled in the art from the following description of a preferred embodiment and the accompanying drawings, in which.

DISCLOSURE OF PREFERRED EMBODIMENT

Figure 1:
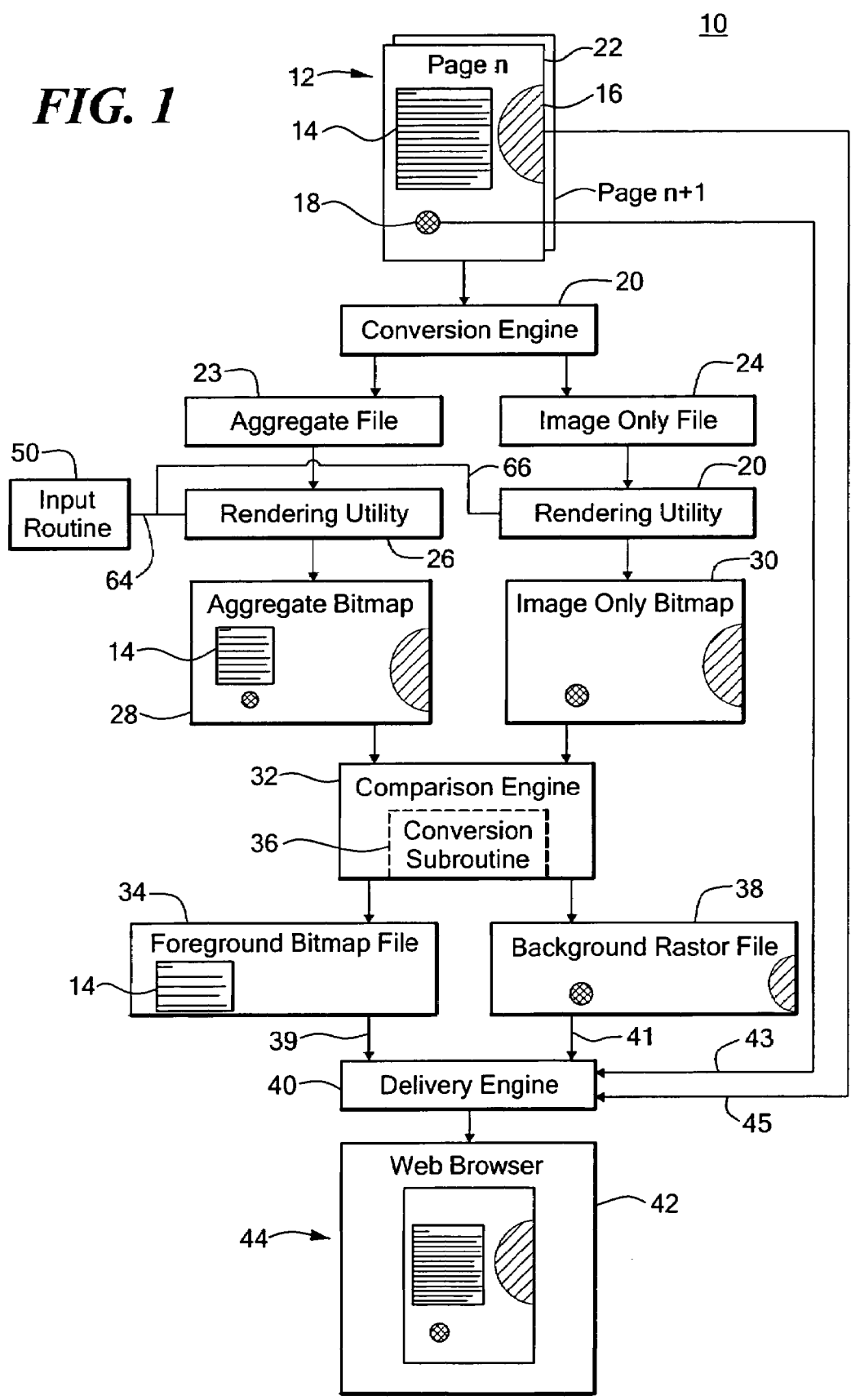
FIG. 1 is a schematic block diagram showing the primary components associated with one system for converting a page description file to a composite representation thereof for fast web viewing in accordance with this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

As discussed in the Background section above, prior systems and methods for displaying page description documents which contain both text and images therein require a viewing application or plug-in to be installed before the desired page of the page description file can be viewed, for example, the ADOBE® Reader for a PDF file. Prior systems and methods which render page description files to JPEG, PNG and GIF format files cannot provide a compact representation of a page description file which can maintain both high-quality line drawings and characters drawn from fonts (e.g., text) and images.

In contrast in the preferred embodiment, system 10, FIG. 1 of the subject invention converts graphics-based page description file 12 to a unique composite representation (discussed below) which has both high-quality line drawing (text) and images, is relatively compact, and can be viewed by any standard Web browser (e.g., INTERNET EXPLORER®, NETSCAPE®, MOZILLA®, SAFARI®, and the like) without the need for an additional viewing program or plug-in.

System 10 includes conversion engine 20 for converting a page, such as page 22 of page description file 12 into aggregate file 23 which contains all metrics of page 22. The metrics of page 22 may include text, text position, font information, line drawing instructions, image objects, and image positions. Aggregate file 23 is a file which contains a complete copy of page 22, i.e., it includes both line drawings and characters drawn from fonts, e.g., text 14, as well as the image part of page 22, e.g., image objects 16 and 18. Ideally, aggregate file 23 is in the scalable vector graphics (SVG) format. SVG is an XML-based language which describes two-dimensional vector and mixed vector/raster graphics. Although aggregate file 23 may be in SVG, any suitable language known to those skilled in the art may be used.

Conversion engine 20 also converts page 22 of page description file 12 into image-only file 24 which contains the metrics that represent the background image object files 16 and 18. Metrics that represent the background image object file may include embedded image files, image file position, rotation, and image size. Image-only file 24 is a file which contains only the image part of page 22, e.g., image objects 16 and 18 and is also ideally converted to SVG or a similar format. Typically, image-only file 24 includes a plurality of image object files, such as image object files 16 and 18. In a preferred embodiment, image object files 16 and 18 are stored in an image format such as JPEG or PNG.

Figure 2:
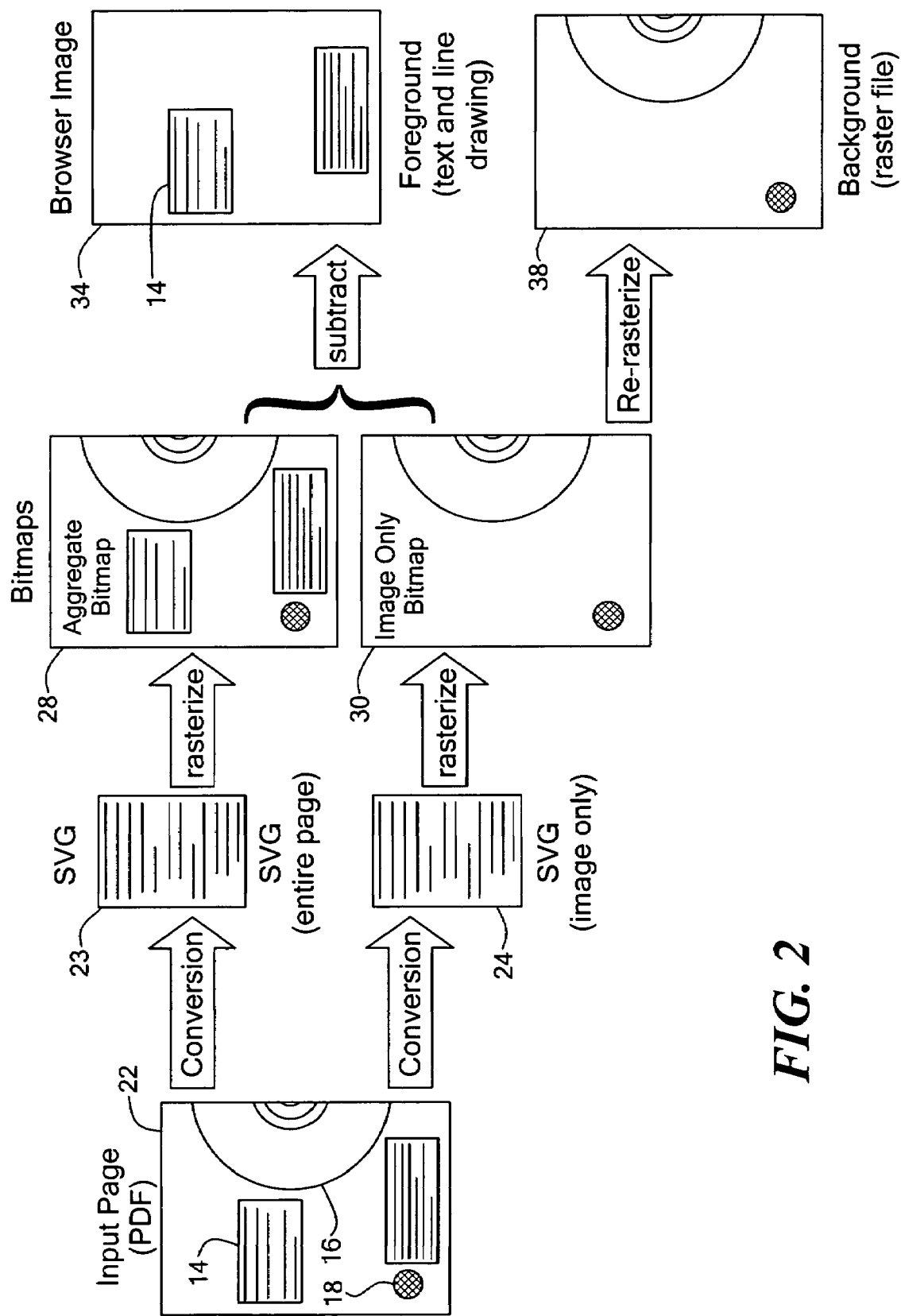
FIG. 2 is a schematic block diagram showing one example of an input page of a page description file being converted into separate foreground and background files in accordance with the subject invention.

An example of an input page description page 22 which has been converted by the conversion engine 20 of this invention to an SVG file which contains all metrics of the entire page (e.g., the aggregate file 23) and an SVG file that contains the image-only part of the page description page 22 (e.g., image-only file 24) is shown in FIG. 2, where like parts have been given like numbers.

System 10, FIG. 1 also includes rendering utility 26 for rendering (i.e., rasterizing or creating an image file from a data file) aggregate file 23 into high-quality aggregate bitmap 28. Rendering utility 20 similarly renders image-only file 24 into high-quality image-only bitmap 30. Examples of rendering utilities which may be utilized for rendering file 22 and file 24 include BATIK® and ADOBE® Graphics Server. Other similar rendering utilities will occur to those skilled in the art. An example of a rendered aggregate bitmap 28 and rendered image-only bitmap 30 is shown in FIG. 2.

System 10, FIG. 1 also includes comparison engine 32, for comparing image-only bitmap 30 and aggregate bitmap 28 to create foreground bitmap 34 which can be displayed on any standard Web browser, such as INTERNET EXPLORER®, NETSCAPE®, and the like. Foreground bitmap 34 contains only the text part and line drawing instructions of aggregate bitmap 28, e.g., text 14. Foreground bitmap 34 is transparent everywhere except where the pixels in aggregate bitmap 28 (e.g., the text) differ from the pixels in image-only bitmap 30. An example of foreground bitmap file 34 with text 14 is shown in FIG. 2.

Comparison engine 32 also includes conversion subroutine 36, FIG. 1 for converting image-only bitmap 30 to background raster file 38. Background raster file 38 is typically in a format such as JPEG or PNG which can readily be viewed on any standard Web browser. An example of background raster file 38 which has been generated by comparison engine 32 is shown in FIG. 2.

Delivery engine 40, FIG. 1 delivers foreground bitmap file 34 and background raster file 38 (indicated at lines 39 and 41) or foreground bitmap file 34 and background image object files 16 and 18 (indicated at lines 39, 43 and 45, respectively) to Web browser 42, FIG. 1 based on the type of Web browser 42 (e.g., INTERNET EXPLORER®, NETSCAPE®, MOZILLA®, or SAFARI®) and a comparison of the size of background raster file 38, FIG. 1 to the sum of the sizes of background object files 16 and 18 by generating HTML code which superimposes foreground bitmap file 34 and background raster file 38, or foreground bitmap file 34 and background object files 16 and 18, on Web browser 42, FIG. 1. Ideally, the HTML code is compatible with HTML coding standards which allow for absolute or relative positioning of JPEG and PNG images on a page, and supports transparency in PNG images. Delivery engine 40 is ideally located on a computer server 41, FIG. 3, where like parts have been given like numbers. An example of HTML code used to display foreground bitmap file 34 and background raster file 38, or foreground bitmap file 34 and background image objects 16 or 18 is indicated at 68, FIG. 3.

Figure 3:
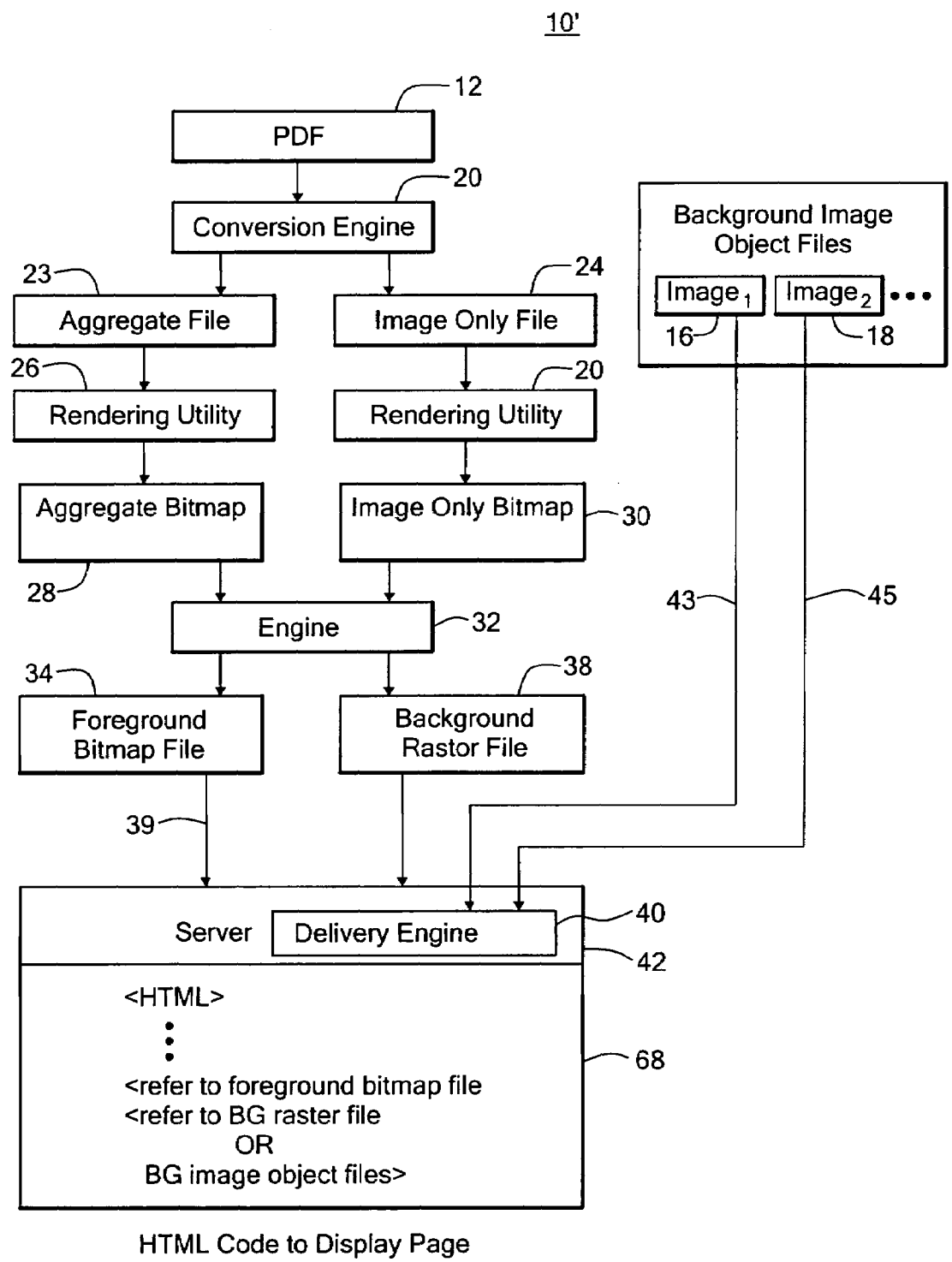
FIG. 3 is a schematic block diagram of the system for converting a page description file shown in FIG. 1 showing one example of the HTML code used to display a page of the composite representation of this invention on a server.

The result is that system 10, FIG. 1 and FIG. 3 of this invention, provides a compact, high-quality image and text composite representation of a page of a page description file which can be displayed on any standard Web browser without the need for any additional programs, or plug-ins. The reduced file size reduces download time and storage requirements.

In one design, system 10, FIG. 1 may include user input routine 50 for entering a desired zoom factor (magnification) which is input into rendering utility 26, as indicated at 64 and 66. In one example, the zoom factor which may be input to routine 50 includes 125%, 150%, or 200%.

Figure 4:
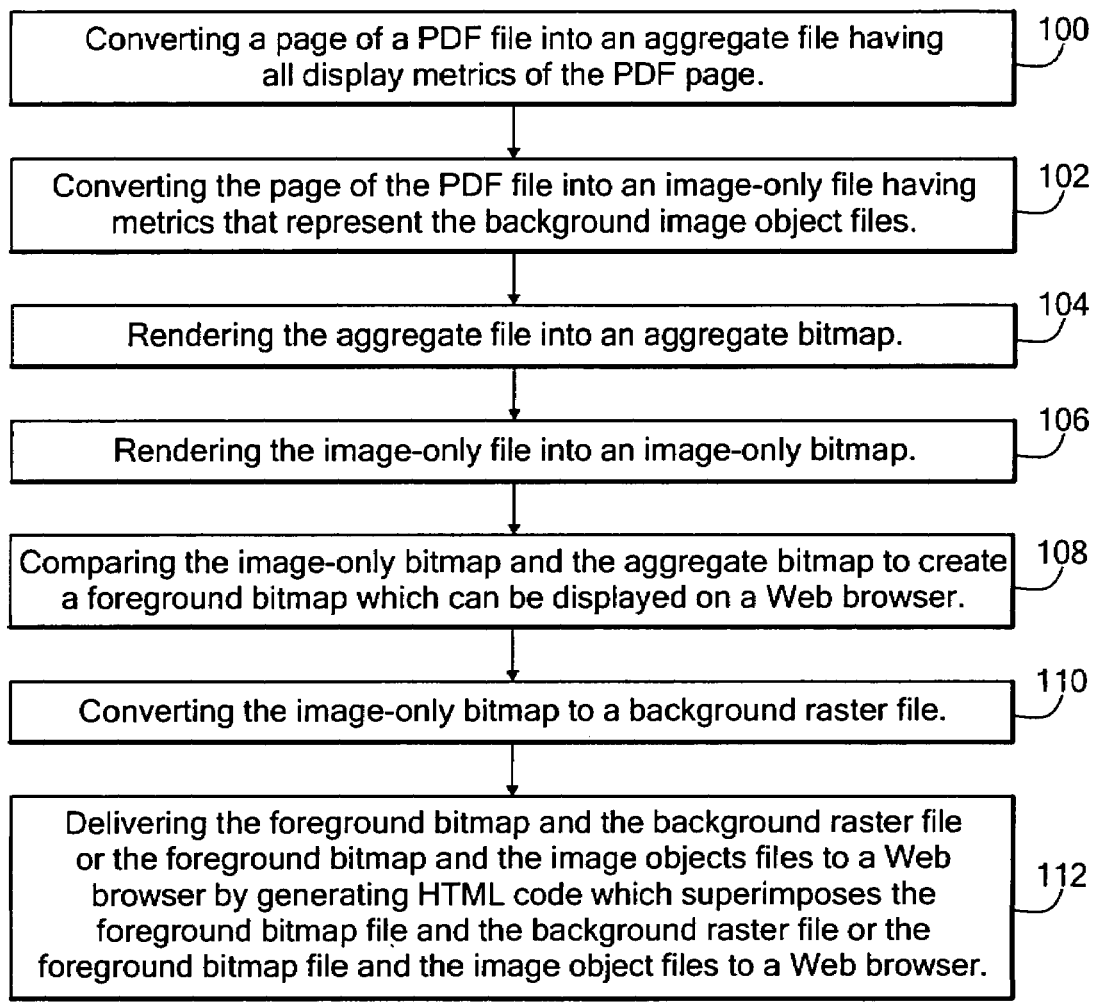
FIG. 4 is a flowchart showing the primary steps of one method for converting a page description file to a composite representation thereof for fast web viewing in accordance with the subject invention.

One exemplary method for converting a graphics-based page description file to a composite representation thereof for fast web viewing includes the steps of converting page 22, FIG. 1 of page description file 12 into aggregate file 23 having all display metrics of page description page 22, step 100, FIG. 4; converting page 22, FIG. 1 of page description file 12 to image-only file 24 having all metrics that represent background image object files 16 and 18, step 102, FIG. 4; rendering aggregate file 22, FIG. 1 to aggregate bitmap 28, step 104, FIG. 4; rendering image-only file 24, FIG. 1 to image-only bitmap 28, step 106, FIG. 4; comparing image-only bitmap 30, FIG. 1 and aggregate bitmap 28 to create foreground bitmap 34 which can be displayed on a Web browser, step 108; converting image-only bitmap 30, FIG. 1 to background raster file 38, step 110, FIG. 4; and delivering foreground bitmap file 34, FIG. 1 and background raster file 38, or foreground bitmap file 34 and background image object files 16 and 18 to Web browser 42, FIG. 1, by generating HTML code which superimposes foreground bitmap file 34 and background raster file 38 or background image object files 16 and 18 on Web browser 42, FIG. 1 to provide a high-quality, compact composite representation 44 of page 22 which can be viewed on any standard Web browser without the need for a viewing plug-in, step 112, FIG. 4.

Figure 5:
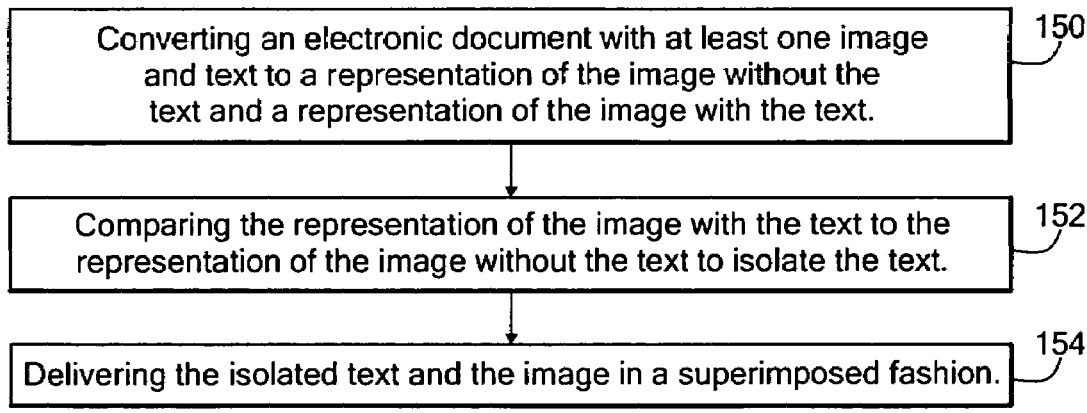
FIG. 5 is a flowchart showing the primary steps of another method for converting an electronic document to a composite representation in accordance with the subject invention.

In another embodiment of this invention, the method for converting an electronic document with at least one image and text to a composite representation includes the steps of converting an electronic document with at least one image and text to a representation of the image without the text and a representation of the image with the text, step 150, FIG. 5; comparing the representation of the image with the text to the representation of the image without the text to isolate the text, step 152; and delivering the isolated text and the image in a superimposed fashion, step 154.

In one design, the delivery may include delivering the images of the electronic document, such as image objects 16 and 18, FIG. 1, or the representation of the images, such as background raster file 38, whichever is smaller. Ideally, the electronic document is a graphics-based page description file, such as page description file 12. In one example, the representation of the images, e.g., image-only bitmap 30 may be converted from an image-only bitmap file to a background raster file, such as background raster file 38. Ideally, the representation of the image with text is stored in an aggregate bitmap file Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A system for converting a page description file to a composite representation thereof for fast web viewing, said system comprising:
    a conversion engine configured to convert a page of said page description file into an aggregate file having all display elements of said page and to convert said page into an image-only file configured in a scalable vector graphics language and having metrics that represent the background image object files of said page;
    a rendering utility for rendering said aggregate file to an aggregate bitmap and for rendering said image-only file into an image-only bitmap;
    a comparison engine for comparing the image-only bitmap and the aggregate bitmap to create a foreground bitmap file which is displayed on a Web browser, said comparison engine further including a conversion sub routine for converting said image-only bitmap file to a background raster file;
    a delivery engine for delivering said foreground bitmap file and said background raster file, or said foreground bitmap file and said background image object files, to a Web browser by creating HTML code which superimposes said foreground bitmap file and said background raster file or said foreground bitmap file and said background image object files on a Web browser, thereby providing a small sized, high quality image and text composite representation of said page of said page description file; and
    wherein said system is configured to be compatible with HTML and HTML coding standards such that no additional application, or program, or plug-in other than said Web browser is required to display said composite representation of said page of said page description file.

2. The system of claim 1 in which said delivery of said foreground bitmap file and said background raster file, or said foreground bitmap file and said background image object files is based on said Web browser type and the smaller file size of said background raster file or said background image object files.

3. The system of claim 1 in which said foreground bitmap is transparent except where the pixels in the aggregate bitmap differ from the pixels of the image-only bitmap.

4. The system of claim 1 in which said image-only file includes a plurality of image object files.

5. The system of claim 4 in which said plurality of image object files are configured in an image format chosen from the group consisting of JPEG and PNG.

6. The system of claim 1 wherein said aggregate file is configured in SVG language.

7. The system of claim 1 in which said background raster file is configured in an image format chosen from the group consisting of: JPEG, PNG, and GIF.

8. The system of claim 1 in which said HTML image standards include JPEG and PNG.

9. The system of claim 1 further including a user input routine configured to enter a desired zoom factor.

10. The system of claim 9 in which said image zoom factor is any number greater than zero including the visible range on a Web browser window from 10.00% to 1200.00%.

11. The system of claim 1 in which said delivery engine is located on a server computer.

12. A method for converting a page description file to a composite representation thereof for fast web viewing, the method comprising:
    converting a page of said page description file into an aggregate file having all display metrics of said page description file page;
    converting a page of said page description file into an image-only file configured in a scalable vector graphics language and having metrics that represent the background image object files of said page description file page;
    rendering said aggregate file to an aggregate bitmap;
    rendering said image-only file into an image-only bitmap;
    comparing said image-only bitmap and said aggregate bitmap to create a foreground bitmap which is displayed on a Web browser;
    converting said image-only bitmap file to a background raster file;
    delivering said foreground bitmap file and said background raster file, or said foreground bitmap file and said background image object flies, to a Web browser; by creating HTML code which superimposes said foreground bitmap file and said background raster file, or said foreground bitmap file and said background object files on said Web browser, to provide a small sized, high quality image and text composite representation of the said page of said page description file; and
    wherein said method is configured to be compatible with HTML and HTML coding standards such that no additional application, or program, or plug-in other than said Web browser is required to display said composite representation of said page of said page description file.

13. The method of claim 12 in which said delivery of said foreground bitmap file and said background raster file or said foreground bitmap file and said background object file is based on a Web browser type and the smaller file size of said background raster file and said background object files.

14. The method of claim 12 in which said foreground bitmap is transparent except where the pixels in the aggregate bitmap differ from the pixels of the image-only bitmap.

15. The method of claim 12 in which said image-only file includes a plurality of image object files.

16. The method of claim 15 in which said plurality of image object files are configured in an image format chosen from the group consisting of: JPEG, PNG, and GIF.

17. The method of claim 12 wherein said aggregate file is configured in a scalable vector graphics SVG language.

18. The method of claim 12 in which said background raster file is configured in an image format chosen from the group consisting of: JPEG and PNG.

19. The method of claim 12 further including the step of inputting a desired image zoom factor.

20. The method of claim 19 in which said image zoom factor is any number greater than zero including the visible range on a Web browser window from 10.00% to 1200.00%.

* * * * *